(12) United States Patent
Tauchi

(10) Patent No.: US 11,479,063 B2
(45) Date of Patent: Oct. 25, 2022

(54) PNEUMATIC TIRE

(71) Applicant: The Yokohama Rubber Co., LTD., Tokyo (JP)

(72) Inventor: Risa Tauchi, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 0 days.

(21) Appl. No.: 16/486,144

(22) PCT Filed: Nov. 27, 2017

(86) PCT No.: PCT/JP2017/042466
§ 371 (c)(1),
(2) Date: Aug. 14, 2019

(87) PCT Pub. No.: WO2018/159035
PCT Pub. Date: Sep. 7, 2018

(65) Prior Publication Data
US 2019/0359011 A1 Nov. 28, 2019

(30) Foreign Application Priority Data
Feb. 28, 2017 (JP) .............................. JP2017-036961

(51) Int. Cl.
*B60C 15/06* (2006.01)
(52) U.S. Cl.
CPC .......... *B60C 15/06* (2013.01); *B60C 15/0628* (2013.01); *B60C 2015/0614* (2013.01)
(58) Field of Classification Search
CPC ..... B60C 15/00; B60C 15/0009; B60C 15/06; B60C 15/0603; B60C 15/0607;
(Continued)

(56) References Cited

U.S. PATENT DOCUMENTS

| 4,046,183 A * | 9/1977 | Takahashi ............... B60C 15/06 |
| | | 152/541 |
| 2015/0231934 A1* | 8/2015 | Asari .................. B60C 15/0009 |
| | | 152/523 |

(Continued)

FOREIGN PATENT DOCUMENTS

| EP | 393966 | * 10/1990 |
| EP | 243558 | * 1/1991 |

(Continued)

OTHER PUBLICATIONS

International Search Report for International Application No. PCT/JP2017/042466 dated Feb. 20, 2018, 4 pages, Japan.

*Primary Examiner* — Justin R Fischer
(74) *Attorney, Agent, or Firm* — Thorpe North & Western

(57) ABSTRACT

A pneumatic tire includes: a carcass layer wrapping a bead core and a bead filler and being turned back; a steel chafer formed by steel cords and disposed between the carcass layer and a rim fitting surface; and sub-chafers between the steel chafer and the rim fitting surface and made of organic fiber. The steel chafer includes an outer end portion outward of the bead filler in a tire lateral direction. The outer end portion has a height from 0.5 times to 0.7 times a height of a rim flange. The sub-chafers each include an outer end portion outward of the bead filler in the tire lateral direction. The outer end portion has a height from 0.7 times to 0.9 times a height of a rim flange. The carcass layer has a turned up height from 2.5 times to 4.5 times a height of a rim flange.

65 Claims, 5 Drawing Sheets

(58) Field of Classification Search
CPC ........ B60C 15/0628; B60C 2015/0614; B60C 2015/0617; B60C 15/0632; B60C 2015/0621; B60C 2015/0625; B60C 15/0635; B60C 15/009; B60C 15/0036; B60C 15/0045; B60C 15/0054; B60C 15/0063; B60C 2015/009; B60C 2015/065

See application file for complete search history.

(56) References Cited

U.S. PATENT DOCUMENTS

| | | |
|---|---|---|
| 2017/0015145 A1 | 1/2017 | Tanaka |
| 2017/0021679 A1 | 1/2017 | Wang |

FOREIGN PATENT DOCUMENTS

| | | |
|---|---|---|
| EP | 810106 | * 12/1997 |
| JP | 2002-219913 | 8/2002 |
| JP | 2007-145272 | 6/2007 |
| JP | 2015-116973 | 6/2015 |
| JP | 5858069 | 2/2016 |
| JP | 2016-159840 | 9/2016 |
| JP | 2017-013538 | 1/2017 |
| JP | 2017-019452 | 1/2017 |
| WO | WO 2015/133043 | 9/2015 |

* cited by examiner

PNEUMATIC TIRE

TECHNICAL FIELD

The present technology relates to a pneumatic tire.

BACKGROUND ART

In the related art, a construction vehicle tire has a problem of separation that is generated at a steel chafer end portion due to overload. To solve this problem, Japan Patent No. 5858069 describes a technique for suppressing the movement of a chafer end portion by disposing a steel chafer including an outer end portion having a height from 0.5 times or more to 1.0 times or less a height of a rim flange.

SUMMARY

In a tire including a bead structure provided with a chafer made of organic fiber, separation may be generated at an outer end portion of the chafer made of organic fiber, and there is room for improvement.

The present technology provides a pneumatic tire that includes a chafer structure made of steel and organic fiber, and that can suppress the separation at outer end portions of all chafers.

A pneumatic tire according to an aspect of the present technology includes: a pair of bead cores; a pair of bead fillers disposed outward of the pair of bead cores in a tire radial direction, respectively; a carcass layer disposed wrapping the pair of bead cores and the pair of bead fillers, and being turned back; a steel chafer formed by arraying a plurality of steel cords and disposed between the carcass layer and a rim fitting surface; and two or more sub-chafers disposed between the steel chafer and the rim fitting surface and made of organic fiber; the steel chafer including an outer end portion outward of one of the pair of bead fillers in a tire lateral direction, the outer end portion having a height from 0.5 times or more to 0.7 times or less a height of a rim flange with a measuring point of a rim diameter being assigned as a reference; the sub-chafers each including an outer end portion outward of the one of the pair of bead fillers in a tire lateral direction, the outer end portion having a height from 0.7 times or more to 0.9 times or less a height of a rim flange with the measuring point of the rim diameter being assigned as a reference; and the carcass layer having a turned up height from 2.5 times or more to 4.5 times or less a height of a rim flange with the measuring point of the rim diameter being assigned as a reference.

Preferably, the steel chafer includes an inner end portion inward of the one of the pair of bead fillers in a tire lateral direction, and the inner end portion has a height within the range of a height of one of the pair of bead cores with the measuring point of the rim diameter being assigned as a reference.

Preferably, the two or more sub-chafers each include an inner end portion inward of the one of the pair of bead fillers in a tire lateral direction, and the inner end portion has a height 0.65 times or less the height of the rim flange with the measuring point of the rim diameter being assigned as a reference.

Preferably, the pneumatic tire further includes a shock absorbing rubber disposed sandwiched between the carcass layer and the outer end portion of the steel chafer.

Preferably, a height Hc of an inner end portion of the shock absorbing rubber in a tire radial direction and a height Hf of a rim flange with the measuring point of the rim diameter being assigned as a reference have a relationship Hc/Hf ≤0.4.

Preferably, a height Hs of the outer end portion of the steel chafer and the height Hc of the inner end portion of the shock absorbing rubber in a tire radial direction have a difference Hs−Hc that is in the range 45 mm ≤Hs−Hc.

Preferably, the shock absorbing rubber has a modulus at 100% elongation in the range of from 2.0 MPa or more to 4.0 MPa or less.

Preferably, a rubber gauge G between the carcass layer and the outer end portion of the steel chafer is in the range 5.0 mm ≤G.

Preferably, the steel cords constituting the steel chafer each have a diameter in the range of from 1.0 mm or more to 3.0 mm or less, an angle formed by a longitudinal direction of each of the steel cords and a tire radial direction is in the range of from 50 degrees or more to 75 degrees or less, and the steel cords have disposal density in the range of from 10 pieces/5 cm or more to 40 pieces/5 cm or less.

Preferably, the steel chafer extends from a region outward of the one of the pair of bead fillers in a tire lateral direction to a region further inward than a center of gravity of the one of the pair of bead cores in a tire lateral direction.

Preferably, the pneumatic tire is applied to a heavy duty tire.

A pneumatic tire according to an embodiment of the present technology achieves an effect of being able to suppress the separation at outer end portions of all chafers.

DETAILED DESCRIPTION

Figure 1:
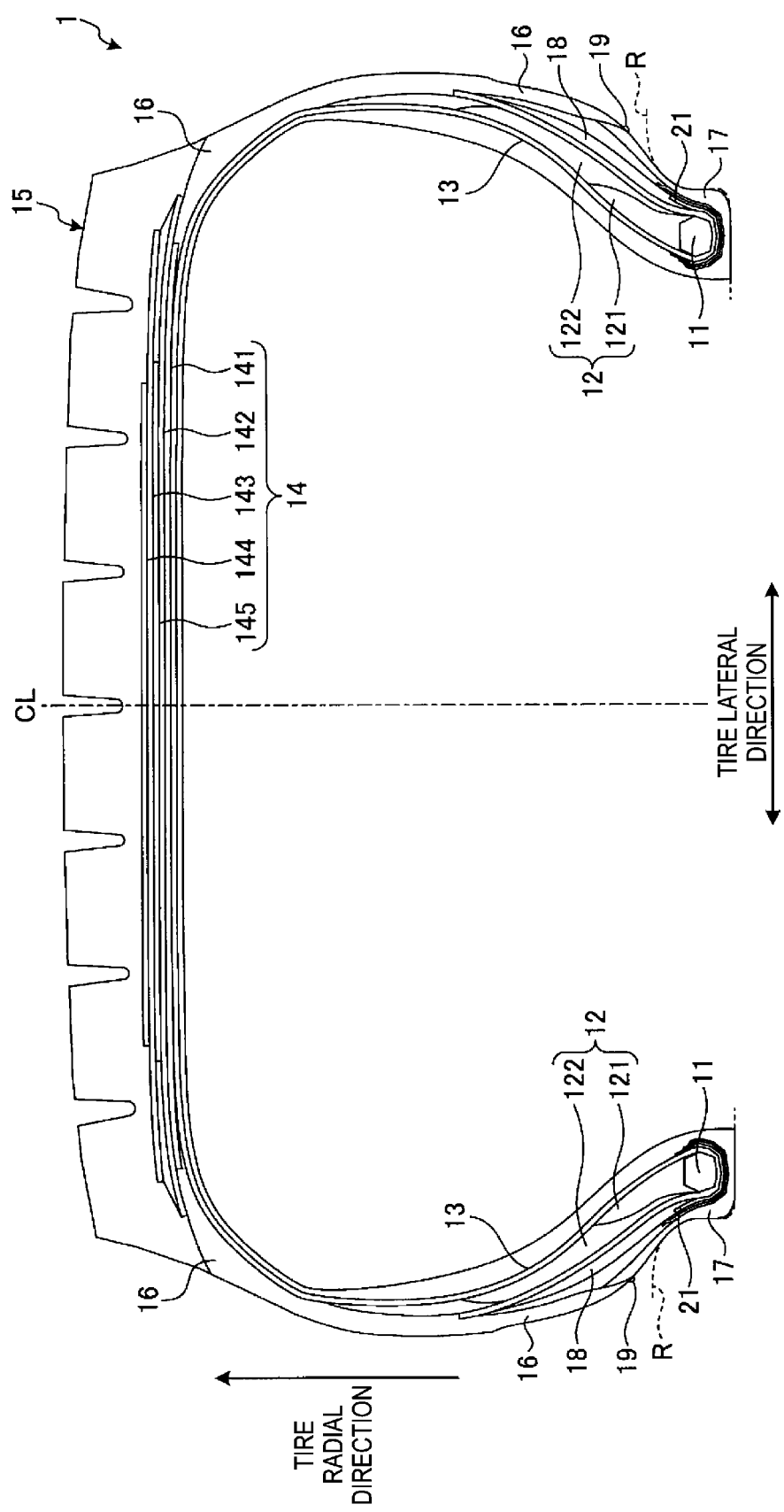
FIG. 1 is a cross-sectional view in a tire meridian direction illustrating a pneumatic tire according to an embodiment of the present technology.

Embodiments of the technology will be described in detail below with reference to the drawings. Note that embodiments of the technology are not limited to these embodiments. Additionally, constituents of the embodiments include elements substitutable and obviously substitutable while maintaining consistency with the embodiments of the technology. Additionally, a plurality of modifications described in the embodiments can be combined as appropriate within the scope obvious to one skilled in the art. Note that in the following description with reference to each figure, identical or substantially similar components to components of the other figures are denoted by the same reference signs, and description of those components are simplified or omitted. Pneumatic Tire FIG. 1 is a cross-sectional view in a tire meridian direction illustrating a pneumatic tire according to an embodiment of the present technology. FIG. 1 illustrates a cross-sectional view in a tire radial direction. Additionally, FIG. 1 illustrates, as an example of the pneumatic tire, a heavy duty radial tire mountable on a truck, a bus, and the like for long-distance transport.

In FIG. 1, cross section in a tire meridian direction refers to a cross section of the tire taken along a plane that includes the tire rotation axis (not illustrated). Additionally, tire equatorial plane denoted by reference sign CL refers to a plane normal to the tire rotation axis that passes through a center point of the tire in the tire rotation axis direction. Additionally, tire lateral direction refers to the direction parallel with the tire rotation axis. Tire radial direction refers to the direction perpendicular to the tire rotation axis.

In FIG. 1, a pneumatic tire 1 includes an annular structure with the tire rotation axis as the center and includes a pair of bead cores 11, 11, a pair of bead fillers 12, 12, a carcass layer 13, a belt layer 14, a tread rubber 15, a pair of sidewall rubbers 16, 16, a pair of rim cushion rubbers 17, 17, and a pair of shock absorbing rubbers 18, 18. The pair of sidewall rubbers 16, 16 is provided in lower portions with rim check lines 19, 19, respectively.

The pair of bead cores 11, 11 is annular members each of which is formed by bundling a plurality of lines of bead wire together. The pair of bead cores 11, 11 constitutes cores of bead portions left and right. Each of the pair of bead fillers 12, 12 includes a lower filler 121 and an upper filler 122. The pair of bead fillers 12, 12 is disposed outward of the pair of bead cores 11, 11 in the tire radial direction, respectively and constitute the bead portions.

The carcass layer 13 extends between the bead cores 11, 11 left and right in a toroidal form, and constitutes a framework of the tire. Additionally, both end portions of the carcass layer 13 are turned back outward in the tire lateral direction from the inside in the tire lateral direction and wrap the bead cores 11 and the bead fillers 12, and the both end portions of the carcass layer 13 are fixed. Additionally, the carcass layer 13 is also made by performing a rolling process on a plurality of carcass cords coating rubber-covered and made of steel or an organic fiber material (for example, nylon, polyester, rayon, or the like). The carcass layer 13 has a carcass angle (inclination angle in the fiber direction of the carcass cords with respect to the tire circumferential direction), as an absolute value, ranging from 85 degrees or more to 95 degrees or less. Note that while the carcass layer 13 includes a single layer structure including a single carcass ply in the configuration of FIG. 1, besides this, the carcass layer 13 may include a multilayer structure formed by layering a plurality of carcass plies.

The belt layer 14 is formed by layering a plurality of belt plies 141 to 145, and is disposed wound around an outer circumference of the carcass layer 13. The belt plies 141 to 145 include a large-angle belt 141, a pair of cross belts 142, 143, a belt cover 144, and a circumferential reinforcing layer 145, for example. Additionally, each of the belt plies 141 to 145 is formed by performing a rolling process on a plurality of belt codes coating rubber-covered and made of steel or an organic fiber material, and has a predetermined belt angle (inclination angle in the longitudinal direction of the belt cords with respect to the tire circumferential direction).

The tread rubber 15 is disposed outward of the carcass layer 13 and the belt layer 14 in the tire radial direction and constitutes a tread portion of the tire. The pair of sidewall rubbers 16, 16 is disposed outward of the carcass layer 13 in the tire lateral direction, respectively and constitute left and right sidewall portions. The pair of rim cushion rubbers 17, 17 is disposed inward of the bead cores 11, 11 left and right and turned back portions of the carcass layer 13 in the tire radial direction, respectively and constitute contact surfaces of the bead portions left and right with flanges of rims R (referred to below as rim flanges, as appropriate).

Chafer

A heavy duty radial tire in the related art includes a steel chafer 21 formed of steel cords in a rim fitting portion of a carcass layer to protect the carcass layer and suppress air leakage from the rim fitting portion. Additionally, an off the road (OR) tire, in other words, a construction vehicle tire is provided with a steel chafer, and thus can secure a rubber gauge Ga while suppressing the set deformation of a bead sheet portion.

The configuration in which the steel chafer 21 described above is provided has a problem in that the separation of a peripheral rubber is likely to be generated at an outer end portion of the steel chafer 21 (end portion outward of a bead filler in the tire lateral direction). In particular, it is conceived that a separating point 20 between a rim flange and the pneumatic tire 1, and the vicinity of the separating point 20 are subjected to repeated deformation and, in the separating point 20 and the vicinity of the separating point 20, strain increases, and thus separation is likely to be generated. The range from the separating point 20 to a height Hf of the rim flange is subjected to repeated deformation during the rotation of the pneumatic tire 1. Thus, when an end portion of each chafer is disposed in the range, shear strain increases and separation is generated. Accordingly, it is desirable to prevent the end portion from being disposed in the range that is subjected to repeated deformation during the rotation of the pneumatic tire 1.

Thus, the pneumatic tire 1 employs the following configuration to suppress the separation of the peripheral rubber at the outer end portion of the steel chafer 21.

Figure 2:
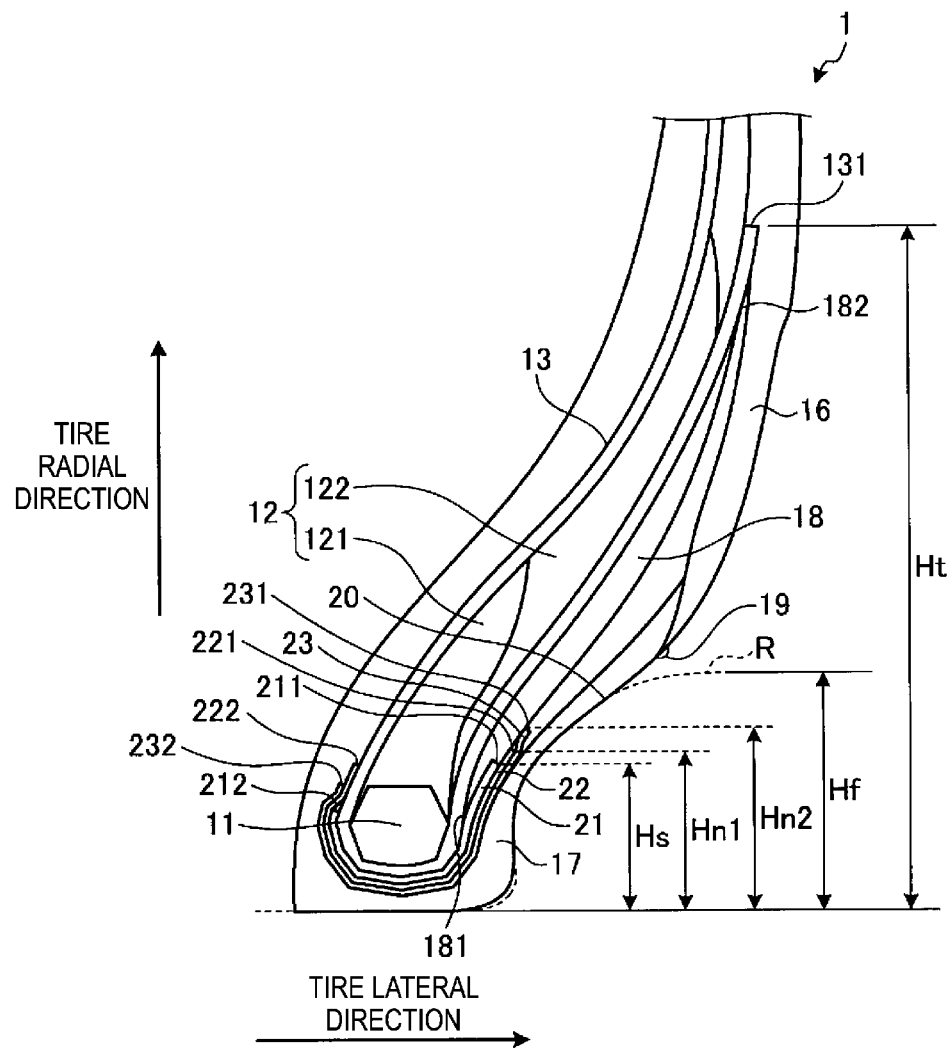
FIG. 2 is an enlarged cross-sectional view illustrating a bead portion of the pneumatic tire illustrated in FIG. 1.
Figure 3:
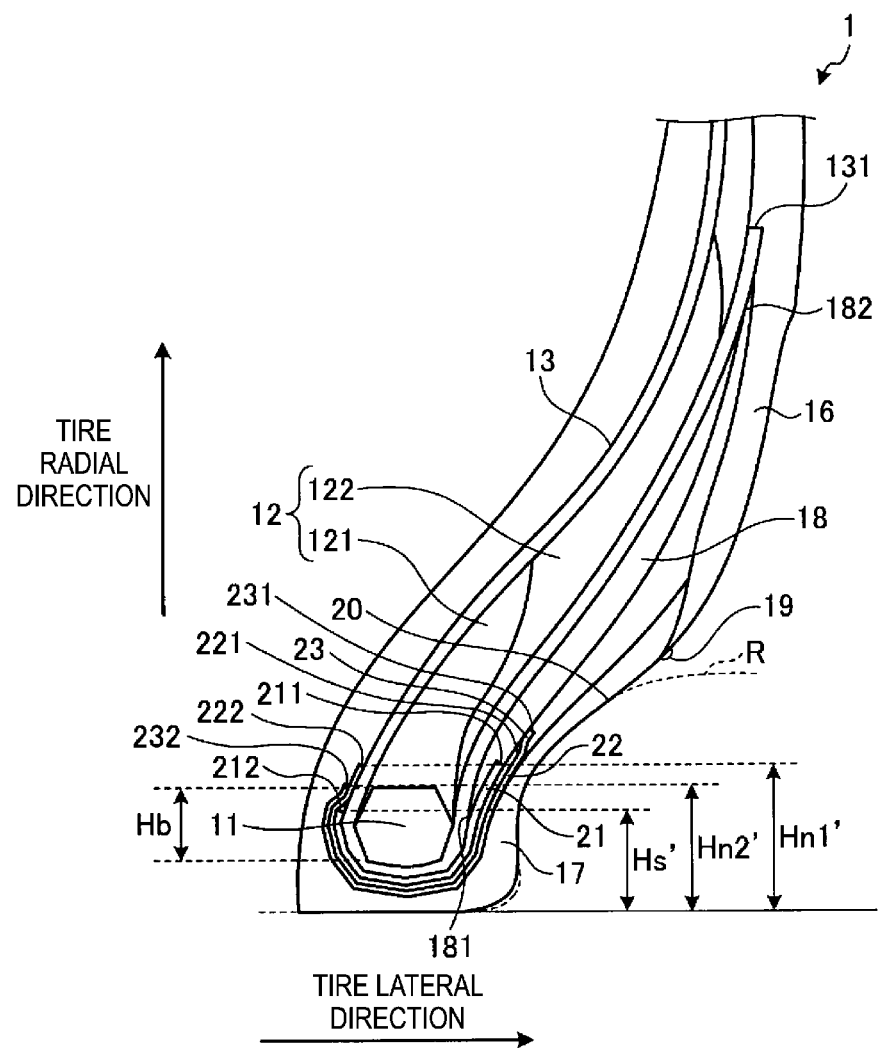
FIG. 3 is an enlarged cross-sectional view illustrating a bead portion of the pneumatic tire illustrated in FIG. 1.
Figure 4:
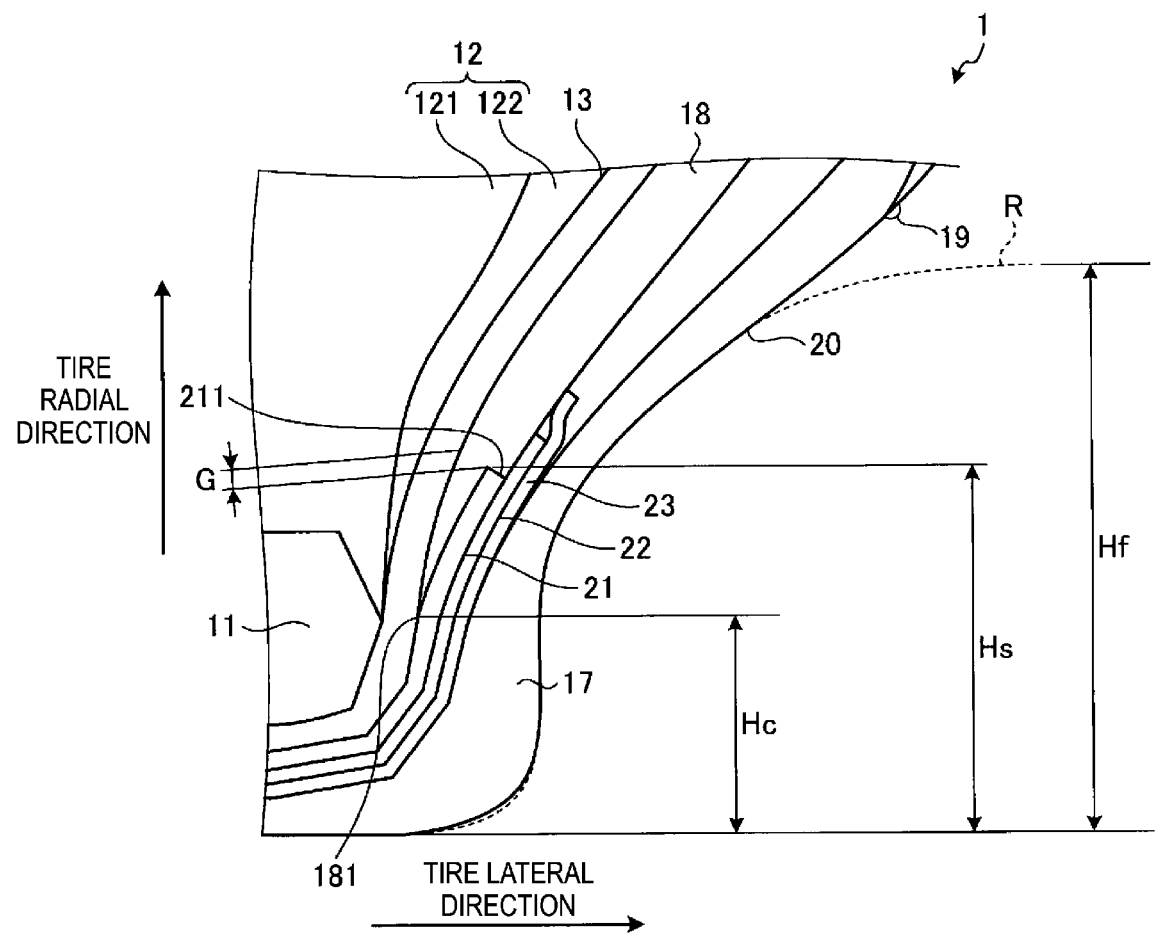
FIG. 4 is an enlarged cross-sectional view illustrating an example of the bead portion illustrated in each of FIGS. 2 and 3.
Figure 5:
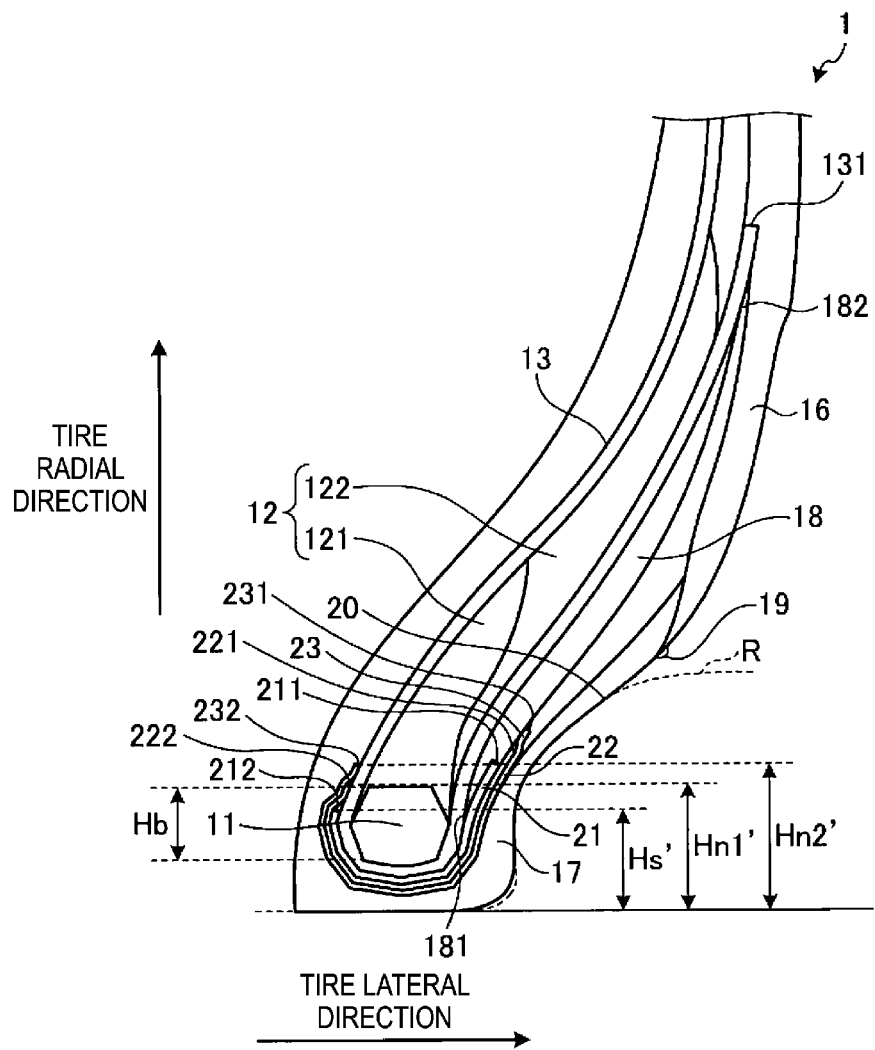
FIG. 5 is an enlarged cross-sectional view illustrating another example of the bead portion illustrated in each of FIGS. 2 and 3.

FIGS. 2 and 3 are each an enlarged cross-sectional view illustrating a bead portion of the pneumatic tire illustrated in FIG. 1. FIG. 4 is an enlarged cross-sectional view illustrating an example of the bead portion illustrated in each of FIGS. 2 and 3. FIG. 5 is an enlarged cross-sectional view illustrating another example of the bead portion illustrated in each of FIGS. 2 and 3. These figures each illustrate an enlarged cross-sectional view of one of a left-and-right pair of the bead portions.

As illustrated in FIG. 2, the pneumatic tire 1 includes at least one steel chafer 21. The steel chafer 21 is a reinforcing layer that is disposed in the rim fitting portion of the pneumatic tire 1 and that protects the carcass layer 13. The steel chafer 21 includes, for example, a sheet-shaped member formed by arraying a plurality of steel cords and being subjected to a rolling process, fabric formed by weaving a plurality of steel cords, a composite material formed by rubber coating the sheet-shaped member or the fabric, and the like.

For example, in the configuration of FIG. 2, the single carcass layer 13 is turned up outward in the tire lateral direction from the inside in the tire lateral direction and wraps a bead core 11, and the single carcass layer 13 is fixed. Additionally, the single steel chafer 21 is disposed between the carcass layer 13 and the rim fitting surface and extends along the carcass layer 13. Additionally, the steel chafer 21 is disposed uniformly around an entire circumference of the tire. Additionally, the steel chafer 21 is disposed turned up together with the carcass layer 13 and wrap a turned up portion of the carcass layer 13 from the inside in the tire radial direction. Additionally, the steel chafer 21 includes a turned up end portion 212 inward in the tire lateral direction, and the turned up end portion 212 extends outward in the tire radial direction adjacent to the carcass layer 13. Additionally, the steel chafer 21 includes a turned up end portion 211 outward in the tire lateral direction, and the turned up end portion 211 extends outward in the tire radial direction together with the turned up portion of the carcass layer 13. Thus, the turned up end portion 211 is positioned further outward than the bead core 11 in in the tire radial direction.

In the configuration described above, the steel chafer 21 is interposed between the carcass layer 13 and the rim flange and protects the carcass layer 13 in a state where the pneumatic tire 1 is mounted on a rim R. Accordingly, air leakage from the rim fitting portion between the pneumatic tire 1 and the rim R is suppressed.

Here, in left and right end portions of the steel chafer 21 in a cross-sectional view in the tire meridian direction (refer to FIG. 2), turned up end portion 211 positioned outward of a bead filler 12 in the tire lateral direction is referred to as an outer end portion, and turned up end portion 212 positioned inward of the bead filler 12 in the tire lateral direction is referred to as an inner end portion.

At this time, a height Hs of the outer end portion 211 of the steel chafer 21 and the height Hf of the rim flange with a measuring point of a rim diameter being assigned as a reference have the relationship $0.5 \leq Hs/Hf \leq 0.7$ (refer to FIGS. 2 to 4). Additionally, more preferably, a ratio Hs/Hf is in the range $0.55 \leq Hs/Hf \leq 0.65$.

The height Hs of the outer end portion 211 of the steel chafer 21 is measured when the pneumatic tire 1 is mounted on a specified rim, inflated to specified internal pressure, and is in an unloaded state.

The height Hf of the rim flange is a difference between the maximum diameter of a rim flange portion of the specified rim and the rim diameter.

Here, specified rim refers to an "applicable rim" defined by the Japan Automobile Tyre Manufacturers Association (JATMA), a "Design Rim" defined by the Tire and Rim Association (TRA), or a "Measuring Rim" defined by the European Tyre and Rim Technical Organisation (ETRTO). Additionally, specified internal pressure refers to "maximum air pressure" defined by JATMA, or refers to a maximum value in "TIRE LOAD LIMITS AT VARIOUS COLD INFLATION PRESSURES" defined by TRA, or to "INFLATION PRESSURES" defined by ETRTO. Additionally, specified load refers to a "maximum load capacity" defined by JATMA, or refers to a maximum value in "TIRE LOAD LIMITS AT VARIOUS COLD INFLATION PRESSURES" defined by TRA, or to "LOAD CAPACITY" defined by ETRTO. However, in JATMA, in the case of a passenger vehicle tire, the specified internal pressure is air pressure of 180 kPa, and the specified load is 88% of the maximum load capacity.

In the configuration described above, satisfying $0.5 \leq Hs/Hf$, the height Hs of the steel chafer 21 is ensured, and the reinforcement by the steel chafer 21 is appropriately ensured. Additionally, satisfying $Hs/Hf \leq 0.7$, the outer end portion 211 of the steel chafer 21 is sandwiched and held between the rim R and the carcass layer 13 in a state where the tire is mounted on the rim. Accordingly, the strain of a peripheral rubber at the outer end portion 211 of the steel chafer 21 is suppressed, and the separation of the peripheral rubber at the outer end portion 211 is suppressed.

Note that in the configuration of FIG. 2, each of the steel cords constituting the steel chafer 21 preferably has a diameter ranging from 1.0 mm or more to 3.0 mm or less. Additionally, an angle formed by the longitudinal direction of the steel cords and the tire radial direction is preferably in the range of from 50 degrees or more to 75 degrees or less, and more preferably in the range of from 60 degrees or more to 70 degrees or less. Additionally, the steel chafer 21 has disposal density of the steel codes per width of 5 cm preferably in the range of from 10 pieces/5 cm or more to 40 pieces/5 cm or less, and more preferably in the range of from 20 pieces/5 cm or more to 30 pieces/5 cm or less. Accordingly, the strength of the steel chafer 21 is appropriately ensured.

Additionally, in the configuration of FIG. 2, the inner end portion 212 of the steel chafer 21 extends inward of the bead filler 12 in the tire lateral direction. In the configuration described above, the steel chafer 21 preferably extends throughout the rim fitting surface, from a viewpoint of suitably obtaining the reinforcement by the steel chafer 21.

The inner end portion 212 of the steel chafer 21 may be positioned in front of the position in the configuration of FIG. 2 to set the extension range of the steel chafer 21 narrow (not illustrated). At this time, when the inner end portion 212 of the steel chafer 21 is at least in a region further inward than the center of gravity of the bead core 11 in the tire lateral direction and further outward than the center of gravity of the bead core 11 in the tire radial direction, the reinforcement by the steel chafer 21 can be ensured appropriately. Additionally, preferably, the steel chafer 21 extends from a region outward of the bead filler 12 in the tire lateral direction to a region further inward than the center of gravity of the bead core 11 in the tire lateral direction.

Additionally, in the configuration of FIG. 2, the single steel chafer 21 is disposed. However, besides this, a plurality of the steel chafers 21 may be layered and disposed (not illustrated).

Sub-Chafer

Additionally, in the configuration of FIG. 2, the pneumatic tire 1 includes sub-chafers 22, 23. The sub-chafers 22, 23 are provided outward of the steel chafer 21 that wraps the bead core 11. Thus, in the present example, three chafers are disposed. The steel chafer 21 is disposed at the innermost side (side closer to the bead core 11), the sub-chafer 22 is disposed outward of the steel chafer 21, and the sub-chafer 23 is further disposed outward of the sub-chafer 22. The sub-chafers 22, 23 are each an auxiliary reinforcing layer disposed covering the outer end portion 211 of the steel chafer 21 from the outside in the tire lateral direction. Additionally, the sub-chafers 22, 23 are each made of an organic fiber material (for example, nylon, polyester, rayon, or the like), and each include, for example, a sheet-shaped member formed by arraying a plurality of organic fiber cords and being subjected to a rolling process, fabric formed by weaving a plurality of organic fiber cords, a composite material formed by rubber coating the sheet-shaped member or the fabric, and the like.

For example, in the configuration of FIG. 2, a pair of the sub-chafers 22, 23 is disposed between the steel chafer 21 and a rim cushion rubber 17 and extends along the steel chafer 21. Additionally, the pair of sub-chafers 22, 23 is disposed uniformly around the entire circumference of the tire. Additionally, the sub-chafers 22, 23 are disposed turned up together with the carcass layer 13, and cover throughout the steel chafer 21 from the inside in the tire radial direction. Additionally, at least one of the sub-chafers 22, 23 extends outward in the tire radial direction beyond the outer end portion 211 and the inner end portion 212 of the steel chafer 21. Accordingly, the outer end portion 211 and the inner end portion 212 of the steel chafer 21 are reliably covered with the sub-chafers 22, 23. Additionally, the inner end portion 212 and the outer end portion 211 of the steel chafer 21, an outer end portion 221 and an inner end portion 222 of the sub-chafer 22, and an outer end portion 231 and an inner end portion 232 of the sub-chafer 23 are disposed at positions differing from one another. Accordingly, the stress concentration at the position of each of the end portions of the chafers 21, 22 and 23 is alleviated.

The outer end portions 221, 231 of the sub-chafer 22, 23 made of organic fiber have heights Hn1, Hn2, respectively, and the heights Hn1, Hn2 are each from 0.7 times or more to 0.9 times or less the height Hf of the rim flange. Note that While the height Hn1 and the height Hn2 have the relationship Hn1 ≤Hn2 in FIG. 2, the relationship is not limited to this. The height Hn1 and the height Hn2 may have the relationship Hn1 >Hn2 (not illustrated).

In the configuration described above, the sub-chafers 22, 23 cover the outer end portion 211 and the inner end portion 212 of the steel chafer 21. This suppresses the movement of the outer end portion 211 and the inner end portion 212 of the steel chafer 21 during tire roll. Accordingly, the strain of the peripheral rubber at the outer end portion 211 and the inner end portion 212 of the steel chafer 21 is suppressed, and the separation of the peripheral rubber is suppressed. Thus, in the pneumatic tire 1 including a plurality of chafer end portions, the separation at the outer end portion 211 of the steel chafer 21 can be prevented. Then, the placement described above can prevent the outer end portion 211 of the steel chafer 21 from being provided in the range which is from the separating point 20 between the rim flange and the pneumatic tire 1 to the height Hf of the rim flange and is subjected to repeated deformation and in which strain increases. Accordingly, the generation of circumferential shear strain at the chafer end portion can be prevented.

Additionally, as the heights Hn1, Hn2 of the outer end portions 221, 231 of the sub-chafers 22, 23 made of organic fiber increase, strain increases. Thus, the heights Hn1 and Hn2 are each set in the range equal to or less than the height Hf of the rim flange. The number of the sub-chafers made of organic fiber is preferably two. This is because a too small distance between the end portions of the sub-chafers increases strain. Note that in the sub-chafers 22, 23, a distance between the end portions of the chafers adjacent to each other, in other words, a distance between the outer end portion 221 and the outer end portion 231, and a distance between the inner end portion 222 and the inner end portion 232 are each at least 5 mm, and preferably 8 mm or more.

Meanwhile, in FIG. 2, a height Ht (turned up height) of a turned up end portion 131 of the carcass layer 13 is from 2.5 times or more to 4.5 times or less the height Hf of the rim flange. When the height Ht of the turned up end portion 131 is less than 2.5 times the height Hf of the rim flange, the strain at a carcass end portion during tire roll increases. When the height Ht of the turned up end portion 131 is more than 4.5 times the height Hf of the rim flange, the strain at the carcass end portion also increases. Thus, the both are not preferable.

In FIG. 3, the inner end portion 212 of the steel chafer 21 has a height Hs' in the range of a height Hb of the bead core 11 with the measuring point of the rim diameter being assigned as a reference. In other words, the inner end portion 212 of the steel chafer 21 is positioned within the range of the height Hb of the bead core 11. As described above, the inner end portion 212 of the steel chafer 21 is disposed at a position having no deformation as with the outer end portion 211, and this can suppress the separation at the inner end portion 212. Note that the height Hs' of the inner end portion 212 of the steel chafer 21 has an upper limit that is in the range in which the height Hs' does not overlap with the height of the outer end portion 211, and a lower limit that is a minimum height required inward in the tire lateral direction to ensure the rigidity of the bead portions by the steel chafer 21.

Additionally, in FIG. 3, the inner end portions 222, 232 of the sub-chafers 22, 23 made of organic fiber have heights Hn1', Hn2', respectively, and the heights Hn1', Hn2' are each 0.65 times or less the height Hf of the rim flange with the measuring point of the rim diameter being assigned as a reference. The inner end portions 222, 232 of the sub-chafers 22, 23 are each disposed at a position having no deformation as with the outer end portions 221, 231, and this can suppress the separation at each of the inner end portions 222, 232. Note that while the height Hn1' and the height Hn2' have the relationship Hn1' >Hn2' in FIG. 3, the relationship is not limited to this. Of the inner end portions 222, 232, the inner end portion 232 positioned further outward is preferably higher. In other words, as illustrated in FIG. 5, the height Hn1' and the height Hn2' preferably have the relationship Hn1' <Hn2'.

Shock Absorbing Rubber

Additionally, in FIG. 2, the pneumatic tire 1 includes a shock absorbing rubber 18. The shock absorbing rubber 18 is sandwiched between the carcass layer 13 and the outer end portion 211 of the steel chafer 21. In the configuration described above, the shock absorbing rubber 18 is interposed between the carcass layer 13 and the outer end portion 211 of the steel chafer 21, and this alleviates the strain of the peripheral rubber at the outer end portion 211 of the steel chafer 21 (buffering of the shock absorbing rubber 18). Accordingly, the separation of the peripheral rubber is suppressed.

For example, in the configuration of FIG. 2, the single carcass layer 13 is turned up outward in the tire lateral direction from the inside in the tire lateral direction and wraps the bead core 11, and the single carcass layer 13 is fixed. Additionally, the shock absorbing rubber 18 is disposed outward of the turned up portion of the carcass layer 13 in the tire lateral direction, and extends in the tire radial direction along the turned up portion of the carcass layer 13. Additionally, the shock absorbing rubber 18 is disposed uniformly around the entire circumference of the tire. Additionally, the shock absorbing rubber 18 includes a portion inward in the tire radial direction, and the portion inward in the tire radial direction is sandwiched between the turned up portion of the carcass layer 13 and the outer end portion 211 of the steel chafer 21. Accordingly, the shock absorbing rubber 18 is interposed between the carcass layer 13 and the outer end portion 211 of the steel chafer 21 and separates the carcass layer 13 and the outer end portion 211 of the steel chafer 21.

Additionally, in FIG. 4, a height Hc of an inner end portion 181 of the shock absorbing rubber 18 in the tire radial direction and the height Hf of the rim flange with the measuring point of the rim diameter being assigned as a reference preferably have the relationship Hc/Hf ≤0.4, and more preferably have the relationship Hc/Hf ≤0.3. Accordingly, the extension range of the shock absorbing rubber 18 in the rim fitting portion is appropriately ensured, and the buffering of the shock absorbing rubber 18 is appropriately obtained. Note that in the configuration of FIG. 2, the inner end portion 181 of the shock absorbing rubber 18 in the tire radial direction extends to a lateral side of the bead core 11. An outer end portion 182 of the shock absorbing rubber 18 in the tire radial direction extends to the vicinity of the turned up end portion 131 of the carcass layer 13.

While a lower limit of a ratio Hc/Hf is not particularly limited, the lower limit is subjected to restrictions by the relationship with a difference Hs–Hc described below.

A position of the inner end portion 181 of the shock absorbing rubber 18 in the tire radial direction is not particularly limited, and may be further outward than a position at the height Hf of the rim flange in the tire radial direction. However, excess volume of the shock absorbing rubber 18 increases rolling resistance of the tire, and thus this is not preferable.

The height Hc of the inner end portion 181 of the shock absorbing rubber 18 is measured when the tire is mounted on a specified rim, inflated to specified internal pressure, and is in an unloaded state.

Additionally, in FIG. 4, the height Hs of the outer end portion 211 of the steel chafer 21 and the height Hc of the inner end portion 181 of the shock absorbing rubber 18 in the tire radial direction preferably have the difference Hs–Hc that is in the range 45 mm ≤Hs–Hc. Accordingly, the extension range of the shock absorbing rubber 18 with the outer end portion 211 of the steel chafer 21 being assigned as a reference is appropriately ensured and the buffering of the shock absorbing rubber 18 is appropriately obtained.

While an upper limit of the difference Hs–Hc is not particularly limited, the upper limit is subjected to restrictions by the relationship with the ratio Hc/Hf described above.

Additionally, in FIG. 4, a rubber gauge G between the carcass layer 13 and the outer end portion 211 of the steel chafer 21 is preferably in the range 5.0 mm ≤G. Accordingly, the rubber gauge G at or near the outer end portion 211 of the steel chafer 21 is ensured, and the buffering of the shock absorbing rubber 18 is appropriately obtained.

While an upper limit of the rubber gauge G is not particularly limited, excess volume of the shock absorbing rubber 18 increases rolling resistance of the tire, and thus this is not preferable.

In a cross-sectional view in the tire meridian direction tire, the rubber gauge G is measured as a thickness of a rubber member provided between the carcass cords constituting the carcass layer 13 and a steel cord at the outermost side in the tire radial direction of the steel cords constituting the steel chafer 21. Additionally, the rubber member to be measured as the rubber gauge G includes a coating rubber of the carcass layer 13, a coating rubber of the steel chafer 21, and the like, other than the shock absorbing rubber 18.

Additionally, in the configuration of FIG. 2, the shock absorbing rubber 18 has a modulus at 100% elongation preferably in the range of from 2.0 MPa or more to 4.0 MPa or less, and more preferably in the range of from 2.3 MPa or more to 3.2 MPa or less. Accordingly, the shock absorbing rubber 18 has appropriate physical properties, and the buffering of the shock absorbing rubber 18 is appropriately obtained.

A modulus of the shock absorbing rubber 18 is measured by a tensile test at room temperature in accordance with JIS-K6251 (using No. 3 dumbbells).

Effects

As described above, the pneumatic tire 1 includes: the pair of bead cores 11, 11; the pair of bead fillers 12, 12 disposed outward of the pair of bead cores 11, 11 in the tire radial direction, respectively; the carcass layer 13 disposed wrapping the bead cores 11 and the bead fillers 12, and being turned back; and the steel chafer 21 formed by arraying a plurality of steel cords and disposed between the carcass layer 13 and the rim fitting surface (refer to FIG. 1). Additionally, the height Hs of the outer end portion 211 of the steel chafer 21 positioned outward of one of the bead fillers 12 in the tire lateral direction and the height Hf of the rim flange with the measuring point of the rim diameter being assigned as a reference have the relationship 0.5 ≤Hs/Hf ≤0.7 (refer to FIGS. 2 to 4).

The configuration described above has an advantage in that the outer end portion 211 of the steel chafer 21 has the height Hs appropriate. In other words, satisfying 0.5 ≤Hs/Hf, the height Hs of the steel chafer 21 is ensured and the reinforcement by the steel chafer 21 is appropriately ensured. Additionally, satisfying Hs/Hf ≤0.7, the outer end portion 211 of the steel chafer 21 is sandwiched and held between the rim R and the carcass layer 13 in a state where the tire is mounted on the rim. Accordingly, the strain of the peripheral rubber at the outer end portion 211 of the steel chafer 21 is suppressed and the separation of the peripheral rubber at the outer end portion 211 is suppressed.

Additionally, the pneumatic tire 1 includes the shock absorbing rubber 18 disposed sandwiched between the carcass layer 13 and the outer end portion 211 of the steel chafer 21 (refer to FIG. 2). Additionally, the height Hc of the inner end portion of the shock absorbing rubber 18 in the tire radial direction and the height Hf of the rim flange with the measuring point of the rim diameter being assigned as a reference have the relationship Hc/Hf ≤0.4 (refer to FIG. 4). This has an advantage in that the extension range of the shock absorbing rubber 18 in the rim fitting portion is appropriately ensured, and the buffering of the shock absorbing rubber 18 is appropriately obtained.

Additionally, in the pneumatic tire 1, the height Hs of the outer end portion 211 of the steel chafer 21 and the height Hc of the inner end portion of the shock absorbing rubber 18 in the tire radial direction have the difference Hs–Hc that is in the range 45 mm ≤Hs–Hc. This has an advantage in that the extension range of the shock absorbing rubber 18 with the outer end portion 211 of the steel chafer 21 being assigned as a reference is appropriately ensured and the buffering of the shock absorbing rubber 18 is appropriately obtained. Additionally, in the pneumatic tire 1, the rubber gauge G between the carcass layer 13 and the outer end portion 211 of the steel chafer 21 is in the range 5.0 mm ≤G (refer to FIG. 4). This has an advantage in that the rubber gauge G at or near the outer end portion 211 of the steel chafer 21 is ensured and the buffering of the shock absorbing rubber 18 is appropriately obtained.

Additionally, in the pneumatic tire 1, the steel cords constituting the steel chafer each have a diameter in the range of from 1.0 mm or more to 3.0 mm or less, the angle formed by the longitudinal direction of each of the steel cords and the tire radial direction is in the range of from 50 degrees or more to 75 degrees or less, and disposal density of the steel cords is in the range of from 10 pieces/5 cm or more to 40 pieces/5 cm or less. These have an advantage in that the strength of the steel chafer 21 is appropriately ensured.

Additionally, in the pneumatic tire 1, the shock absorbing rubber 18 has a modulus at 100% elongation in the range of from 2.0 MPa or more to 4.0 MPa or less. This has an advantage in that the shock absorbing rubber 18 has appropriate physical properties, and the buffering of the shock absorbing rubber 18 is appropriately obtained.

Additionally, the pneumatic tire 1 includes the sub-chafers 22, 23 made of organic fiber material and disposed covering the outer end portion 211 of the steel chafer 21 from the outside in the tire lateral direction (refer to FIG. 2). The configuration described above has an advantage in that the sub-chafers 22, 23 cover the outer end portion 211 of the steel chafer 21, this suppresses the movement of the outer end portion 211 of the steel chafer 21 during tire roll, and thus the separation of the peripheral rubber is suppressed.

Additionally, in the pneumatic tire 1, the steel chafer 21 extends from the region outward of the bead filler 12 in the tire lateral direction to the region further inward than the center of gravity of the bead core 11 in the tire lateral direction (refer to FIG. 2). The configuration described above has an advantage in that the steel chafer 21 extends substantially throughout the rim fitting surface, and thus the reinforcement of the steel chafer 21 is suitably obtained.

Target of Application

Note that preferably, the pneumatic tire 1 is applied to a heavy duty tire. A heavy duty tire is subjected to a load greater during the use of the tire than a passenger vehicle tire. Thus, the separation of the peripheral rubber at the outer end portion 211 of the steel chafer 21 is likely to be generated. Then, the heavy duty tire described above is set as a target of application, and this has an advantage in that a significant suppression effect on the separation of the peripheral rubber is obtained.

EXAMPLES

Tables 1 and 2 show results of performance tests of the pneumatic tire 1 according to the embodiment of the technology.

In the performance tests, a plurality of kinds of test tires was evaluated for chafer-edge separation resistance. Additionally, a test tire having a tire size of 26.5R25 L-3 was mounted on a specified rim by TRA, and specified air pressure of 500 kPa was applied to the test tire.

Additionally, a high-load endurance test using an indoor drum testing machine was performed. Then, traveling speed was set to 5 km/h, and a load was increased by 10% every 72 hours from 140% of a specified load, and traveling time until the tire was broken was measured. Then, the measurement results are expressed as index values and evaluated with Conventional Example being assigned as the reference (100). In this evaluation, larger values are more preferable.

The test tire of each of Examples 1 to 15 has the configuration illustrated in FIGS. 1 to 4. The pneumatic tire 1 of each of Examples 1 to 15 includes a carcass layer 13 formed of steel cords, and a steel chafer 21. Additionally, a rim flange has a height Hf of 51 mm. Additionally, steel cords of the steel chafer 21 each have a diameter of 1.8 mm, and an inclination angle with respect to the tire circumferential direction is 65 degrees, and the steel cords have disposal density of 20 pieces/5 cm. Additionally, the test tire of each of Examples 1 to 8 includes no shock absorbing rubber 18. Further, the test tire of each of Examples 9 to 15 includes a shock absorbing rubber 18. The test tire of each of Examples 1 to 15 includes a pair of sub-chafers 22, 23 made of nylon fiber.

In the test tire of Conventional Example, a height Hs of an outer end portion 211 of the steel chafer 21 is 0.7 times a height Hf of a rim flange; heights Hn1, Hn2 of outer end portions 221, 231 of the sub-chafers 22, 23 are 1.1 times and 1.2 times the height Hf of the rim flange, respectively; and a turned up height Ht of the carcass layer 13 is 3.5 times the height Hf of the rim flange. Additionally, in the test tire of Conventional Example, a height Hs' of an inner end portion 212 of the steel chafer 21 is out of the range of a height of a bead core 11; and heights Hn1', Hn2' of inner end portions 222, 232 of the two sub-chafers 22, 23 are 1.2 times and 1.1 times the height Hf of the rim flange, respectively. Further, the test tire of Conventional Example includes the shock absorbing rubber 18 disposed sandwiched between the carcass layer 13 and the outer end portion 211 of the steel chafer 21. In the test tire of Conventional Example, a height Hc of an inner end portion of the shock absorbing rubber 18 in the tire radial direction, and the height Hf of the rim flange have the relationship Hc/Hf ≤0.5; the height Hs of the outer end portion 211 of the steel chafer 21, and the height Hc of the inner end portion of the shock absorbing rubber 18 in the tire radial direction have a difference Hs−Hc of 44 mm; the shock absorbing rubber 18 has a modulus at 100% elongation of 4.3 MPa; and a rubber gauge G between the carcass layer 13 and the outer end portion 211 of the steel chafer 21 is 2.5 mm.

The test tire of Comparative Example 1 has a ratio Hn1/Hf of 0.5 and a ratio Hn2/Hf of 0.6 in the configuration of Example 1. Additionally, the test tire of Comparative Example 1 also has a ratio Hn1'/Hf of 1.6 and a ratio Hn2'/Hf of 1.5 in the configuration of Example 1. Note that the test tire of Comparative Example 1 includes no shock absorbing rubber 18.

As can be seen from the test results, in the test tire of each of Examples 1 to 15, when the height Hs of the outer end portion 211 of the steel chafer 21 outward of a bead filler 12 in the tire lateral direction with a measuring point of a rim diameter being assigned as a reference is from 0.5 times or more to 0.7 times or less the height Hf of the rim flange, and the heights Hn1, Hn2 of the outer end portions 221, 231 of the sub-chafers 22, 23 outward of the bead filler 12 in the tire lateral direction with the measuring point of the rim diameter being assigned as a reference are each from 0.7 times or more to 0.9 times or less the height Hf of the rim flange, and further the turned up height Ht of the carcass layer 13 with the measuring point of the rim diameter being assigned as a reference is from 2.5 times or more to 4.5 times or less the height Hf of the rim flange, the chafer-edge separation resistance of a bead portion of the tire is improved.

Additionally, as can be seen from the test results, in the test tire of each of Examples 1 to 15, when the height Hs' of the inner end portion 212 of the steel chafer 21 inward of the bead filler 12 in the tire lateral direction with the measuring point of the rim diameter being assigned as a reference is within the range of a height Hb of the bead core, more preferable results are obtained.

Further, as can be seen from the test results, in the test tire of each Examples 1 to 15, when the heights Hn1', Hn2' of the inner end portions 222, 232 of the sub-chafers 22, 23 inward of the bead filler 12 in the tire lateral direction are each 0.65 times or less the height Hf of the rim flange, more preferable results are obtained.

Additionally, as can be seen from the test results, in the test tire of each of Examples 1 to 15, when the shock absorbing rubber 18 disposed sandwiched between the carcass layer 13 and the outer end portion 211 of the steel chafer 21 is provided, more preferable results are obtained. As for the shock absorbing rubber 18, it can be seen that when the height Hc of the inner end portion 181 of the shock absorbing rubber 18 in the tire radial direction and the height Hf of the rim flange with the measuring point of the rim diameter being assigned as a reference have the relationship Hc/Hf ≤0.4, more preferable results are obtained. Additionally, it can be seen that when the height Hs of the outer end portion 211 of the steel chafer 21 and the height Hc of the inner end portion 181 of the shock absorbing rubber 18 in the tire radial direction have the difference Hs−Hc that is in the range 45 mm ≤Hs−Hc, more preferable results are obtained. Further, it can be seen that when the shock absorbing rubber 18 has a modulus at 100% elongation in the range of from 2.0 MPa more to 4.0 MPa or less, preferable results are obtained, and when the shock absorbing rubber 18 has a modulus at 100% elongation in the range of from 2.3 MPa or more to 3.2 MPa or less, more preferable results are obtained. Additionally, it can be seen that when the rubber gauge G between the carcass layer 13 and the outer end portion 211 of the steel chafer 21 is in the range 5.0 mm ≤ G, more preferable results are obtained.

TABLE 1

| Content | Conventional Example | Comparative Example 1 | Example 1 | Example 2 | Example 3 |
|---|---|---|---|---|---|
| Hs/Hf | 0.7 | 0.6 | 0.7 | 0.6 | 0.6 |
| Hn1/Hf, Hn2/Hf | 1.1, 1.2 | 0.5, 0.6 | 0.8, 0.9 | 0.7, 0.8 | 0.8, 0.9 |
| Ht/Hf | 3.5 | 3.5 | 3.5 | 3.5 | 3.5 |
| Hs' | Out of range | Out of range | Out of range | Out of range | Out of range |
| Hn1'/Hf, Hn2'/Hf | 1.2, 1.1 | 1.6, 1.5 | 1.2, 1.1 | 1.2, 1.1 | 1.2, 1.1 |
| Presence of shock absorbing rubber | Yes | No | No | No | No |
| Hc/Hf | 0.5 | 0.5 | 0.5 | 0.5 | 0.5 |
| Hs − Hc [mm] | 44 | 44 | 44 | 44 | 44 |
| Modulus of shock absorbing rubber at 100% elongation [Mpa] | 4.3 | — | — | — | — |
| G (mm) | 2.5 | 4.9 | 4.9 | 4.9 | 4.9 |
| Chafer-edge separation resistance | 100 | 95 | 102 | 103 | 104 |

| Content | Example 4 | Example 5 | Example 6 | Example 7 | Example 8 |
|---|---|---|---|---|---|
| Hs/Hf | 0.6 | 0.6 | 0.6 | 0.6 | 0.6 |
| Hn1/Hf, Hn2/Hf | 0.8, 0.9 | 0.8, 0.9 | 0.8, 0.9 | 0.8, 0.9 | 0.8, 0.9 |
| Ht/Hf | 2.5 | 3.5 | 4.5 | 3.5 | 3.5 |
| Hs' | Within range | Within range | Within range | Within range | Within range |
| Hn1'/Hf, Hn2'/Hf | 0.6, 0.5 | 0.6, 0.5 | 0.6, 0.5 | 0.65, 0.6 | 0.75, 0.65 |
| Presence of shock absorbing rubber | No | No | No | No | No |
| Hc/Hf | 0.5 | 0.5 | 0.5 | 0.5 | 0.5 |
| Hs − Hc [mm] | 44 | 44 | 44 | 44 | 44 |
| Modulus of shock absorbing rubber at 100% elongation [Mpa] | — | — | — | — | — |
| G (mm) | 4.9 | 4.9 | 4.9 | 4.9 | 4.9 |
| Chafer-edge separation resistance | 110 | 120 | 115 | 116 | 118 |

TABLE 2

| Content | Example 9 | Example 10 | Example 11 | Example 12 |
|---|---|---|---|---|
| Hs/Hf | 0.6 | 0.6 | 0.6 | 0.6 |
| Hn1/Hf, Hn2/Hf | 0.8, 0.9 | 0.8, 0.9 | 0.8, 0.9 | 0.8, 0.9 |
| Ht/Hf | 3.5 | 3.5 | 3.5 | 3.5 |
| Hs' | Within range | Within range | Within range | Within range |
| Hn1'/Hf, Hn2'/Hf | 0.6, 0.5 | 0.6, 0.5 | 0.6, 0.5 | 0.6, 0.5 |
| Presence of shock absorbing rubber | Yes | Yes | Yes | Yes |
| Hc/Hf | 0.5 | 0.4 | 0.4 | 0.4 |
| Hs − Hc [mm] | 44 | 45 | 45 | 45 |
| Modulus of shock absorbing rubber at 100% elongation [Mpa] | 1.9 | 2.0 | 4.0 | 2.3 |
| G (mm) | 4.9 | 4.9 | 4.9 | 4.9 |
| Chafer-edge separation resistance | 125 | 130 | 130 | 133 |

| Content | Example 13 | Example 14 | Example 15 |
|---|---|---|---|
| Hs/Hf | 0.6 | 0.6 | 0.6 |
| Hn1/Hf, Hn2/Hf | 0.8, 0.9 | 0.8, 0.9 | 0.8, 0.9 |
| Ht/Hf | 3.5 | 3.5 | 3.5 |
| Hs' | Within range | Within range | Within range |
| Hn1'/Hf, Hn2'/Hf | 0.6, 0.5 | 0.6, 0.5 | 0.6, 0.5 |
| Presence of shock absorbing rubber | Yes | Yes | Yes |
| Hc/Hf | 0.4 | 0.4 | 0.4 |

TABLE 2-continued

| | | | |
|---|---|---|---|
| Hs − Hc [mm] | 45 | 45 | 45 |
| Modulus of shock absorbing rubber at 100% elongation [Mpa] | 4.1 | 3.2 | 3.0 |
| G (mm) | 4.9 | 4.9 | 5.0 |
| Chafer-edge separation resistance | 125 | 133 | 135 |

The invention claimed is:

1. A pneumatic tire, comprising:
a pair of bead cores;
a pair of bead fillers disposed outward of the pair of bead cores in a tire radial direction, respectively;
a carcass layer disposed wrapping the pair of bead cores and the pair of bead fillers, and being turned back;
a steel chafer formed by arraying a plurality of steel cords and disposed between the carcass layer and a rim fitting surface; and
two or more sub-chafers disposed between the steel chafer and the rim fitting surface and made of organic fiber;
the steel chafer including an outer end portion outward of one of the pair of bead fillers in a tire lateral direction, the outer end portion having a height from 0.5 times or more to 0.7 times or less a height of a rim flange with a measuring point of a rim diameter being assigned as a reference;
the sub-chafers each including an outer end portion outward of the one of the pair of bead fillers in the tire lateral direction, the outer end portion having a height from 0.7 times or more to 0.9 times or less a height of a rim flange with the measuring point of the rim diameter being assigned as a reference;
the carcass layer having a turned up height from 2.5 times or more to 3.5 times or less a height of a rim flange with the measuring point of the rim diameter being assigned as a reference;
the steel chafer being in contact with one of the two or more sub-chafers;
end portions of first and second sub-chafers among the two or more sub-chafers being disposed laterally outward and radially outward of the outer end portion of the steel chafer;
the first and second sub-chafers being disposed laterally inward of an inner end portion of the steel chafer;
the end portions of the first and second sub-chafers being disposed radially outward of the inner end portion of the steel chafer;
the outer end portion of the steel chafer being disposed at a position other than between a separating point and the height of the rim flange;
the inner end portion of the steel chafer and inner end portions of the sub-chafers inward of each of the bead fillers in the tire lateral direction are all disposed further inward than the outer end portion of the steel chafer in the tire radial direction; and
the separating point being defined as a point where the pneumatic tire separates from contact with the rim flange.

2. The pneumatic tire according to claim 1, wherein
the steel chafer includes the inner end portion inward of the one of the pair of bead fillers in the tire lateral direction, and the inner end portion has a height within a range of a height of one of the pair of bead cores with the measurement point of the rim diameter being assigned as a reference.

3. The pneumatic tire according to claim 2, wherein
the two or more sub-chafers include inner end portions inward of the one of the pair of bead fillers in the tire lateral direction, and the inner end portions of the two or more sub-chafers have a height 0.65 times or less the height of the rim flange with the measurement point of the rim diameter being assigned as a reference.

4. The pneumatic tire according to claim 3, further comprising:
a shock absorbing rubber disposed sandwiched between the carcass layer and the outer end portion of the steel chafer.

5. The pneumatic tire according to claim 4, wherein
a height Hc of an inner end portion of the shock absorbing rubber in the tire radial direction and a height Hf of a rim flange with the measuring point of the rim diameter being assigned as a reference have a relationship $Hc/Hf \leq 0.4$.

6. The pneumatic tire according to claim 5, wherein
a height Hs of the outer end portion of the steel chafer and the height Hc of the inner end portion of the shock absorbing rubber in the tire radial direction have a difference Hs−Hc that is in a range $45\ \text{mm} \leq Hs-Hc$.

7. The pneumatic tire according to claim 6, wherein
the shock absorbing rubber has a modulus at 100% elongation in a range of from 2.0 MPa or more to 4.0 MPa or less.

8. The pneumatic tire according to claim 7, wherein
a rubber gauge G between the carcass layer and the outer end portion of the steel chafer is in a range $5.0\ \text{mm} \leq G$.

9. The pneumatic tire according to claim 8, wherein
the steel cords constituting the steel chafer each have a diameter in a range of from 1.0 mm or more to 3.0 mm or less, and an angle formed by a longitudinal direction of each of the steel cords and the tire radial direction is in a range of from 50 degrees or more to 75 degrees or less, and the steel cords have disposal density in a range of from 10 pieces/5 cm or more to 40 pieces/5 cm or less.

10. The pneumatic tire according to claim 9, wherein
the steel chafer extends from a region outward of the one of the pair of bead fillers in the tire lateral direction to a region further inward than a center of gravity of the one of the pair of bead cores in the tire lateral direction.

11. The pneumatic tire according to claim 10, wherein
the pneumatic tire is applied to a heavy duty tire.

12. The pneumatic tire according to claim 1, wherein
the two or more sub-chafers include the inner end portions inward of the one of the pair of bead fillers in the tire lateral direction, and the inner end portions have a height 0.65 times or less the height of the rim flange with the measurement point of the rim diameter being assigned as a reference.

13. The pneumatic tire according to claim 1, further comprising:
a shock absorbing rubber disposed sandwiched between the carcass layer and the outer end portion of the steel chafer.

14. The pneumatic tire according to claim 13, wherein a height Hc of an inner end portion of the shock absorbing rubber in the tire radial direction and a height Hf of a rim flange with the measuring point of the rim diameter being assigned as a reference have a relationship Hc/Hf≤0.4.

15. The pneumatic tire according to claim 13, wherein a height Hs of the outer end portion of the steel chafer and a height Hc of an inner end portion of the shock absorbing rubber in the tire radial direction have a difference Hs−Hc that is in a range 45 mm≤Hs−Hc.

16. The pneumatic tire according to claim 13, wherein the shock absorbing rubber has a modulus at 100% elongation in a range of from 2.0 MPa or more to 4.0 MPa or less.

17. The pneumatic tire according to claim 13, wherein an inward end portion of the steel chafer in the tire lateral direction is sandwiched between the carcass layer and one of the sub-chafers; and
an outward end portion of the steel chafer in the tire lateral direction is sandwiched between the shock absorbing rubber and another one of the sub-chafers.

18. The pneumatic tire according to claim 1, wherein a rubber gauge G between the carcass layer and the outer end portion of the steel chafer is in a range 5.0 mm≤G.

19. The pneumatic tire according to claim 1, wherein the steel cords constituting the steel chafer each have a diameter in a range of from 1.0 mm or more to 3.0 mm or less, and an angle formed by a longitudinal direction of each of the steel cords and the tire radial direction is in a range of from 50 degrees or more to 75 degrees or less, and the steel cords have disposal density in a range of from 10 pieces/5 cm or more to 40 pieces/5 cm or less.

20. The pneumatic tire according to claim 1, wherein the steel chafer extends from a region outward of the one of the pair of bead fillers in the tire lateral direction to a region further inward than a center of gravity of the one of the pair of bead cores in the tire lateral direction.

21. The pneumatic tire according to claim 1, wherein the pneumatic tire is applied to a heavy duty tire.

22. The pneumatic tire according to claim 1, wherein the steel chafer is in contact with the sub-chafer closest to the bead core of the two or more sub-chafers.

23. The pneumatic tire according to claim 1, wherein a whole surface of a closest side to the sub-chafer of the steel chafer contacts with the sub-chafer.

24. The pneumatic tire according to claim 1, wherein a height of end portions of the two or more sub-chafers are different from each other in the tire radial direction.

25. The pneumatic tire according to claim 1, wherein a height of end portions of the steel chafer in the tire radial direction are different from each height of end portions of the two or more sub-chafers in the tire radial direction.

26. The pneumatic tire according to claim 1, wherein the outer end portion of the steel chafer is disposed inward of the separating point in the tire radial direction.

27. The pneumatic tire according to claim 1, wherein the pneumatic tire is configured for mounting on a rim specified for the pneumatic tire by the Japan Automobile Tyre Manufacturers Association (JATMA), the Tire and Rim Association (TRA), or the European Tyre and Rim Technical Organisation (ETRTO).

28. The pneumatic tire according to claim 1, wherein the height of the rim flange is defined as a difference between a maximum diameter of a flange portion of a rim specified for the pneumatic tire and the rim diameter.

29. A pneumatic tire, comprising:
a pair of bead cores;
a pair of bead fillers disposed outward of the pair of bead cores in a tire radial direction, respectively;
a carcass layer disposed wrapping the pair of bead cores and the pair of bead fillers, and being turned back;
a steel chafer formed by arraying a plurality of steel cords and disposed between the carcass layer and a rim fitting surface; and
two or more sub-chafers disposed between the steel chafer and the rim fitting surface and made of organic fiber;
the steel chafer including an outer end portion outward of one of the pair of bead fillers in a tire lateral direction, the outer end portion having a height from 0.5 times or more to 0.7 times or less a height of a rim flange with a measuring point of a rim diameter being assigned as a reference;
the sub-chafers each including an outer end portion outward of the one of the pair of bead fillers in the tire lateral direction, the outer end portion having a height from 0.7 times or more to 0.9 times or less a height of a rim flange with the measuring point of the rim diameter being assigned as a reference;
the carcass layer having a turned up height from 2.5 times or more to 3.5 times or less a height of a rim flange with the measuring point of the rim diameter being assigned as a reference;
a height of end portions of the two or more sub-chafers being different from each other in the tire radial direction;
end portions of first and second sub-chafers among the two or more sub-chafers being disposed laterally outward and radially outward of the outer end portion of the steel chafer;
the first and second sub-chafers being disposed laterally inward of an inner end portion of the steel chafer;
the end portions of the first and second sub-chafers being disposed radially outward of the inner end portion of the steel chafer;
the outer end portion of the steel chafer being disposed at a position other than between a separating point and the height of the rim flange;
the inner end portion of the steel chafer and inner end portions of the sub-chafers inward of each of the bead fillers in the tire lateral direction are all disposed further inward than the outer end portion of the steel chafer in the tire radial direction; and
the separating point being defined as a point where the pneumatic tire separates from contact with the rim flange.

30. The pneumatic tire according to claim 29, wherein a height of end portions of the steel chafer in the tire radial direction are different from each height of end portions of the two or more sub-chafers in the tire radial direction.

31. The pneumatic tire according to claim 29, wherein the outer end portion of the steel chafer is disposed inward of the separating point in the tire radial direction.

32. The pneumatic tire according to claim 29, wherein the pneumatic tire is configured for mounting on a rim specified for the pneumatic tire by the Japan Automobile Tyre Manufacturers Association (JATMA), the Tire and Rim Association (TRA), or the European Tyre and Rim Technical Organisation (ETRTO).

33. The pneumatic tire according to claim 29, wherein the height of the rim flange is defined as a difference between a maximum diameter of a flange portion of a rim specified for the pneumatic tire and the rim diameter.

34. A pneumatic tire, comprising:
a pair of bead cores;
a pair of bead fillers disposed outward of the pair of bead cores in a tire radial direction, respectively;
a carcass layer disposed wrapping the pair of bead cores and the pair of bead fillers, and being turned back;
a steel chafer formed by arraying a plurality of steel cords and disposed between the carcass layer and a rim fitting surface; and
two or more sub-chafers disposed between the steel chafer and the rim fitting surface and made of organic fiber;
the steel chafer including an outer end portion outward of one of the pair of bead fillers in a tire lateral direction, the outer end portion having a height from 0.5 times or more to 0.7 times or less a height of a rim flange with a measuring point of a rim diameter being assigned as a reference;
the sub-chafers each including an outer end portion outward of the one of the pair of bead fillers in the tire lateral direction, the outer end portion having a height from 0.7 times or more to 0.9 times or less a height of a rim flange with the measuring point of the rim diameter being assigned as a reference;
the carcass layer having a turned up height from 2.5 times or more to 4.5 times or less a height of a rim flange with the measuring point of the rim diameter being assigned as a reference;
the steel chafer being in contact with one of the two or more sub-chafers;
a shock absorbing rubber being disposed sandwiched between the carcass layer and the outer end portion of the steel chafer;
end portions of first and second sub-chafers among the two or more sub-chafers being disposed laterally outward and radially outward of the outer end portion of the steel chafer;
the first and second sub-chafers being disposed laterally inward of an inner end portion of the steel chafer;
the end portions of the first and second sub-chafers being disposed radially outward of the inner end portion of the steel chafer;
the outer end portion of the steel chafer being disposed at a position other than between a separating point and the height of the rim flange;
the inner end portion of the steel chafer and inner end portions of the sub-chafers inward of each of the bead fillers in the tire lateral direction are all disposed further inward than the outer end portion of the steel chafer in the tire radial direction; and
the separating point being defined as a point where the pneumatic tire separates from contact with the rim flange.

35. The pneumatic tire according to claim 34, wherein the steel chafer includes the inner end portion inward of the one of the pair of bead fillers in the tire lateral direction, and the inner end portion has a height within a range of a height of one of the pair of bead cores with a measurement point of the rim diameter being assigned as a reference.

36. The pneumatic tire according to claim 35, wherein the two or more sub-chafers each include an inner end portion inward of the one of the pair of bead fillers in the tire lateral direction, and the inner end portion of the two or more sub-chafers has a height 0.65 times or less the height of the rim flange with the measurement point of the rim diameter being assigned as a reference.

37. The pneumatic tire according to claim 36, wherein a shock absorbing rubber disposed sandwiched between the carcass layer and the outer end portion of the steel chafer.

38. The pneumatic tire according to claim 34, wherein the two or more sub-chafers include the inner end portions inward of the one of the pair of bead fillers in the tire lateral direction, and the inner end portions have a height 0.65 times or less the height of the rim flange with a measurement point of the rim diameter being assigned as a reference.

39. The pneumatic tire according to claim 34, wherein a height Hc of an inner end portion of the shock absorbing rubber in the tire radial direction and a height Hf of a rim flange with the measuring point of the rim diameter being assigned as a reference have a relationship $Hc/Hf \leq 0.4$.

40. The pneumatic tire according to claim 34, wherein a height Hs of the outer end portion of the steel chafer and a height Hc of an inner end portion of the shock absorbing rubber in the tire radial direction have a difference Hs−Hc that is in a range $45 \text{ mm} \leq Hs-Hc$.

41. The pneumatic tire according to claim 40, wherein the shock absorbing rubber has a modulus at 100% elongation in a range of from 2.0 MPa or more to 4.0 MPa or less.

42. The pneumatic tire according to claim 41, wherein a rubber gauge G between the carcass layer and the outer end portion of the steel chafer is in a range $5.0 \text{ mm} \leq G$.

43. The pneumatic tire according to claim 42, wherein the steel cords constituting the steel chafer each have a diameter in a range of from 1.0 mm or more to 3.0 mm or less, and an angle formed by a longitudinal direction of each of the steel cords and the tire radial direction is in a range of from 50 degrees or more to 75 degrees or less, and the steel cords have disposal density in a range of from 10 pieces/5 cm or more to 40 pieces/5 cm or less.

44. The pneumatic tire according to claim 43, wherein the steel chafer extends from a region outward of the one of the pair of bead fillers in the tire lateral direction to a region further inward than a center of gravity of the one of the pair of bead cores in the tire lateral direction.

45. The pneumatic tire according to claim 44, wherein the pneumatic tire is applied to a heavy duty tire.

46. The pneumatic tire according to claim 34, wherein the shock absorbing rubber has a modulus at 100% elongation in a range of from 2.0 MPa or more to 4.0 MPa or less.

47. The pneumatic tire according to claim 34, wherein a rubber gauge G between the carcass layer and the outer end portion of the steel chafer is in a range $5.0 \text{ mm} \leq G$.

48. The pneumatic tire according to claim 34, wherein the steel cords constituting the steel chafer each have a diameter in a range of from 1.0 mm or more to 3.0 mm or less, and an angle formed by a longitudinal direction of each of the steel cords and the tire radial direction is in a range of from 50 degrees or more to 75 degrees or less, and the steel cords have disposal density in a range of from 10 pieces/5 cm or more to 40 pieces/5 cm or less.

49. The pneumatic tire according to claim 34, wherein the steel chafer extends from a region outward of the one of the pair of bead fillers in the tire lateral direction to a region further inward than a center of gravity of the one of the pair of bead cores in the tire lateral direction.

50. The pneumatic tire according to claim 34, wherein the pneumatic tire is applied to a heavy duty tire.

51. The pneumatic tire according to claim 34, wherein the outer end portion of the steel chafer is disposed inward of the separating point in the tire radial direction.

52. The pneumatic tire according to claim 34, wherein the pneumatic tire is configured for mounting on a rim specified for the pneumatic tire by the Japan Automobile Tyre Manufacturers Association (JATMA), the Tire and Rim Association (TRA), or the European Tyre and Rim Technical Organisation (ETRTO).

53. The pneumatic tire according to claim 34, wherein the height of the rim flange is defined as a difference between a maximum diameter of a flange portion of a rim specified for the pneumatic tire and the rim diameter.

54. A pneumatic tire, comprising:
a pair of bead cores;
a pair of bead fillers disposed outward of the pair of bead cores in a tire radial direction, respectively;
a carcass layer disposed wrapping the pair of bead cores and the pair of bead fillers, and being turned back;
a steel chafer formed by arraying a plurality of steel cords and disposed between the carcass layer and a rim fitting surface; and
two or more sub-chafers disposed between the steel chafer and the rim fitting surface and made of organic fiber;
the steel chafer including an outer end portion outward of one of the pair of bead fillers in a tire lateral direction, the outer end portion having a height from 0.5 times or more to 0.7 times or less a height of a rim flange with a measuring point of a rim diameter being assigned as a reference;
the sub-chafers each including an outer end portion outward of the one of the pair of bead fillers in the tire lateral direction, the outer end portion having a height from 0.7 times or more to 0.9 times or less a height of a rim flange with the measuring point of the rim diameter being assigned as a reference;
the carcass layer having a turned up height from 2.5 times or more to 4.5 times or less a height of a rim flange with the measuring point of the rim diameter being assigned as a reference;
the steel chafer being in contact with one of the two or more sub-chafers;
a rubber gauge G between the carcass layer and the outer end portion of the steel chafer being in a range 5.0 mm≤G;
end portions of first and second sub-chafers among the two or more sub-chafers being disposed laterally outward and radially outward of the outer end portion of the steel chafer;
the first and second sub-chafers being disposed laterally inward of an inner end portion of the steel chafer;
the end portions of the first and second sub-chafers being disposed radially outward of the inner end portion of the steel chafer;
the outer end portion of the steel chafer being disposed at a position other than between a separating point and the height of the rim flange;
the inner end portion of the steel chafer and inner end portions of the sub-chafers inward of each of the bead fillers in the tire lateral direction are all disposed further inward than the outer end portion of the steel chafer in the tire radial direction; and
the separating point being defined as a point where the pneumatic tire separates from contact with the rim flange.

55. The pneumatic tire according to claim 54, wherein the outer end portion of the steel chafer is disposed inward of the separating point in the tire radial direction.

56. The pneumatic tire according to claim 54, wherein the pneumatic tire is configured for mounting on a rim specified for the pneumatic tire by the Japan Automobile Tyre Manufacturers Association (JATMA), the Tire and Rim Association (TRA), or the European Tyre and Rim Technical Organisation (ETRTO).

57. The pneumatic tire according to claim 54, wherein the height of the rim flange is defined as a difference between a maximum diameter of a flange portion of a rim specified for the pneumatic tire and the rim diameter.

58. A pneumatic tire, comprising:
a pair of bead cores;
a pair of bead fillers disposed outward of the pair of bead cores in a tire radial direction, respectively;
a carcass layer disposed wrapping the pair of bead cores and the pair of bead fillers, and being turned back;
a steel chafer formed by arraying a plurality of steel cords and disposed between the carcass layer and a rim fitting surface; and
two or more sub-chafers disposed between the steel chafer and the rim fitting surface and made of organic fiber;
the steel chafer including an outer end portion outward of one of the pair of bead fillers in a tire lateral direction, the outer end portion having a height from 0.5 times or more to 0.7 times or less a height of a rim flange with a measuring point of a rim diameter being assigned as a reference;
the sub-chafers each including an outer end portion outward of the one of the pair of bead fillers in the tire lateral direction, the outer end portion having a height from 0.7 times or more to 0.9 times or less a height of a rim flange with the measuring point of the rim diameter being assigned as a reference;
the carcass layer having a turned up height from 2.5 times or more to 4.5 times or less a height of a rim flange with the measuring point of the rim diameter being assigned as a reference;
the steel chafer being in contact with one of the two or more sub-chafers;
a whole surface of a closest side to the sub-chafer of the steel chafer contacting with the sub-chafer;
end portions of first and second sub-chafers among the two or more sub-chafers being disposed laterally outward and radially outward of the outer end portion of the steel chafer;
the first and second sub-chafers being disposed laterally inward of an inner end portion of the steel chafer;
the end portions of the first and second sub-chafers being disposed radially outward of the inner end portion of the steel chafer;
the outer end portion of the steel chafer being disposed at a position other than between a separating point and the height of the rim flange;
the inner end portion of the steel chafer and inner end portions of the sub-chafers inward of each of the bead fillers in the tire lateral direction are all disposed further inward than the outer end portion of the steel chafer in the tire radial direction; and
the separating point being defined as a point where the pneumatic tire separates from contact with the rim flange.

59. The pneumatic tire according to claim 58, wherein the steel chafer is in contact with the sub-chafer closest to the bead core of the two or more sub-chafers.

60. The pneumatic tire according to claim 58, wherein a height of end portions of the two or more sub-chafers are different from each other in the tire radial direction.

61. The pneumatic tire according to claim 58, wherein a height of end portions of the steel chafer in the tire radial direction are different from each height of end portions of the two or more sub-chafers in the tire radial direction.

62. The pneumatic tire according to claim 58, wherein an inward end portion of the steel chafer in the tire lateral direction is sandwiched between the carcass layer and one of the sub-chafers; and an outward end portion of the steel chafer in the tire lateral direction is sandwiched between a shock absorbing rubber and another one of the sub-chafers.

63. The pneumatic tire according to claim 58, wherein the outer end portion of the steel chafer is disposed inward of the separating point in the tire radial direction.

64. The pneumatic tire according to claim 58, wherein the pneumatic tire is configured for mounting on a rim specified for the pneumatic tire by the Japan Automobile Tyre Manufacturers Association (JATMA), the Tire and Rim Association (TRA), or the European Tyre and Rim Technical Organisation (ETRTO).

65. The pneumatic tire according to claim 58, wherein the height of the rim flange is defined as a difference between a maximum diameter of a flange portion of a rim specified for the pneumatic tire and the rim diameter.

* * * * *